United States Patent [19]

Kramer, Sr. et al.

[11] Patent Number: 4,630,350
[45] Date of Patent: Dec. 23, 1986

[54] METHOD FOR MAKING A FLEXIBLE CORRUGATED RUBBER TUBING WITH INTERNAL REINFORCEMENT

[76] Inventors: Vance M. Kramer, Sr., 2341 Townly Rd., Toledo, Ohio 43614; Vance M. Kramer, Jr., 853 Oak Knoll, Perrysburg, Ohio 43554

[21] Appl. No.: 822,538

[22] Filed: Jan. 27, 1986

Related U.S. Application Data

[63] Continuation-in-part of Ser. No. 665,350, Oct. 26, 1984, abandoned.

[51] Int. Cl.$^4$ .................. B23P 11/02; B29C 65/64
[52] U.S. Cl. .................................. 29/453; 29/456; 264/507
[58] Field of Search .................. 29/452, 453, 456; 264/506, 507, 508, DIG. 52

[56] References Cited

U.S. PATENT DOCUMENTS 2,897,840  8/1959  Roberts et al. ............ 264/DIG. 52
4,091,063  5/1978  Logan ........................ 264/506
4,182,019  1/1980  Tally et al. ................ 264/506 X Primary Examiner—Jan Silbaugh
Attorney, Agent, or Firm—Pearne, Gordon, Sessions, McCoy, Granger & Tilberry

[57] ABSTRACT

A method for making flexible, corrugated rubber tubing with internal reinforcement. An extruded sleeve of uncured rubber is slid axially onto an elongated internal forming member, after which an external forming means is placed around the assembled sleeve and used to form corrugations. The resulting product is heat-treated to set the corrugations and thus to form a flexible corrugated tube length. A helix formed of flexible, resilient wire rod is pulled through the corrugated tubing in an axial direction and simultaneously rotated in a direction to thread the helical rod into the internal helical groove in the corrugated product. At the same time, the helix is axially extended to reduce its helix diameter. When the helix has been completely extended through the corrugated tubing, it is released to that it expands radially into tight conformance with the internal helical groove.

1 Claim, 4 Drawing Figures

METHOD FOR MAKING A FLEXIBLE CORRUGATED RUBBER TUBING WITH INTERNAL REINFORCEMENT

BACKGROUND OF THE INVENTION

This application is a continuation-in-part of U.S. application Ser. No. 665,350, filed Oct. 26, 1984, and now abandoned.

This invention relates to corrugated, flexible tubing, especially rubber tubing, including both the helically corrugated type of rubber tubing made using the "cording" method and apparatus disclosed in U.S. Pat. Nos. 2,832,096; 2,879,953; 2,888,712; 2,909,198; 3,155,757; and 3,635,255, and also the type of helically corrugated tubing made using the "axially extensible helix" method and apparatus of U.S. Pat. Nos. 3,168,604; 3,304,581; 3,669,586; 3,705,780; 3,809,522; 3,975,129; 4,053,275; 4,133,828; and 4,360,493.

More particularly, the invention relates to a novel variation of the type of corrugated tubular product that may be made using the basic concepts of the methods and apparatus referred to above, and especially to a novel corrugated, tubular rubber product that has unique properties particularly suitable in special applications where internal reinforcement is required.

Flexible, helically corrugated rubber tubing of the type described is formed of an extruded sleeve of unreinforced, vulcanizable material which, when cured, provides a homogeneous, flexible, resilient wall structure. The resulting helically corrugated, unreinforced tube is flexible and still maintains its tubular form in a semi-rigid condition.

As indicated above, in the past, corrugated, flexible tubing has been made using both the "cording" method and the "axially extensible helix" method, both methods being described in detail in the aforementioned patents. Helically corrugated tubing made according to the "cording" method is made by first drawing an extruded sleeve of uncured rubber axially over an elongated, rotatable mandrel with a core strip wrapped around it to form a single, continuous external thread. The uncured rubber sleeve is forced into the helical groove or root of the thread by a length of cord wrapped around the sleeve to impart a desired corrugated shape. The rubber sleeve is cured in this condition, and the cord removed. After curing, the resulting hose length may be removed from the mandrel and the core strip in a number of ways, such as by being blown off by air pressure from within the mandrel as described in U.S. Pat. No. 2,888,712.

Flexible corrugated tubing of the type to which the present invention is directed may also be produced using the "axially extensible helix" method, as indicated above. In accordance with this method, external forming devices having axially spaced helical convolutions are employed with a forming mandrel to produce embryonic corrugations in uncured rubber sleeves. Each time a tube is formed, the forming member is placed over the forming mandrel on which the uncured rubber sleeve has been positioned, and the sleeve is radially expanded with air pressure from within so that it bulges into the spaces between the helical convolutions, thus forming creases between the bulges. The external forming member and sleeve are then collapsed axially so that the sleeve is axially compressed concertina fashion. The creases, together with adjacent bulges, provide embryonic corrugations. Then the forming member is axially extended together with the sleeve, after which the sleeve is removed from the forming mandrel and placed on a cylindrical curing mandrel, where it is axially foreshortened, concertina fashion, into corrugated form with the desired spacing between adjacent helical corrugations.

The helical corrugations usually provide rigidity in the tubing to prevent collapse, such as when the tubing is flexed around sharp bends. The rigidity, however, is related to a great extent to the thickness of the wall of the tubing relative to the tube diameter. Where the tube diameter is large relative to the wall thickness, the rigidity provided by the corrugations may not be sufficient to resist collapse under some circumstances. In any event, neither of the above methods up to the present produces a product with sufficient rigidity for some applications.

The method and product of the present invention, however, resolve the difficulties indicated above and afford other features and advantages heretofore not obtainable.

SUMMARY OF THE INVENTION

It is among the objects of the present invention to improve the strength and rigidity that can be obtained with flexible, corrugated rubber tubing made in accordance with the prior art "cording" method or the prior art "axially extensible helix" method.

Another object of the invention is to produce flexible, helically corrugated rubber tubing having an internal reinforcement.

In accordance with the invention, a flexible, helically corrugated length of tubing is produced using an extruded sleeve of uncured rubber. The method includes the steps of positioning an extruded sleeve of unreinforced, uncured rubber on a forming mandrel, placing an external, collapsible helical form around the sleeve to define helical convolutions, expanding the sleeve radially, such as by internal air pressure, to form radical bulges between the convolutions, and then axially foreshortening (i.e., compressing) the sleeve and the helical form to form embryonic corrugations in the sleeve. The helical form is then removed and the resulting uncured rubber sleeve with embryonic corrugations is heat-treated while still on the mandrel to form a flexible length of unreinforced, corrugated rubber tubing with a helical internal groove having a root diameter approximately the same as the inner diameter of the helical form. The helical reinforcing component is formed of relatively stiff, resilient wire rod, and has about the same helix outer diameter as the root diameter of the internal helical groove. The wire rod helix is placed adjacent to and in axial alignment with the length of corrugated rubber tubing. Then, an elongated pulling tool is extended axially through the length of corrugated rubber tubing from the end opposite the wire rod helix. The pulling tool is then placed in engagement with the end of the wire rod helix, whereupon the pulling tool is pulled toward the tube length and rotated at the same time to reduce the diameter of the wire rod helix but, as a result of the additional rotation, maintaining a relatively constant pitch. With the wire rod helix in this condition (e.g., stressed but not sufficiently reduced in diameter to be pulled directly through the tube length) it is rotated so as to mesh with the helical groove but not to exert pressure thereon that would generate friction. The rotation and axial advancing are continued until the wire rod helix extends entirely through the unreinforced rubber tube length. When this is done, the pulling tool is released from the end of the helix, whereby the helix expands radially into tight conformance with the groove.

DESCRIPTION OF THE PREFERRED EMBODIMENT

Figure 1:
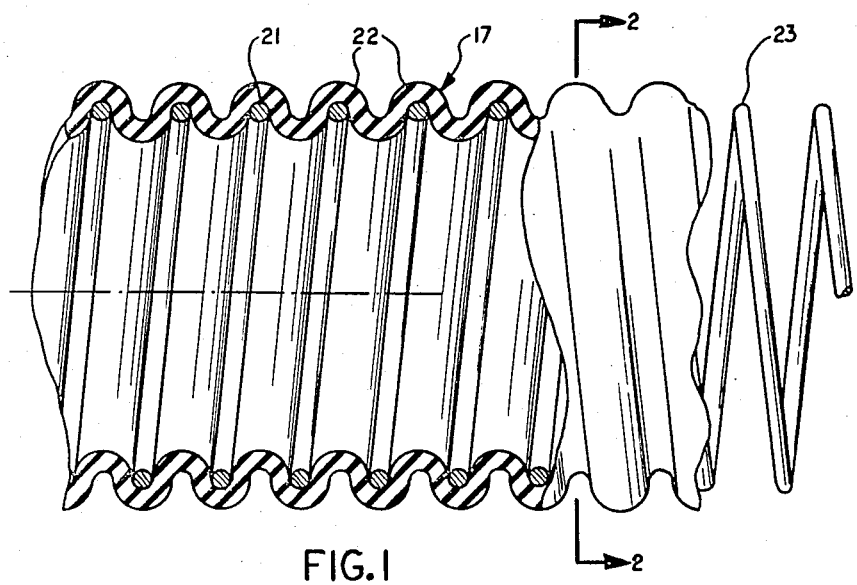
FIG. 1 is a fragmentary, elevational view with parts broken away, illustrating the construction of a flexible, helically corrugated tube length with internal reinforcement made in accordance with the present invention.
Figure 2:
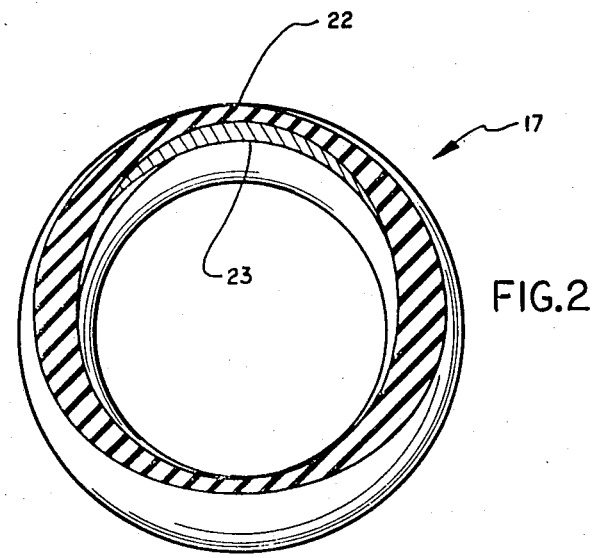
FIG. 2 is a fragmentary, sectional view drawn to the same scale as FIG. 1 and taken on the line 2—2 of FIG. 1.

Referring more particularly to the drawings, FIG. 1 shows a flexible, helically corrugated tube length 17 having external corrugations 22 and an internal helical groove 21. A helix of flexible, resilient wire rod 23 is seated in the internal groove 21 to provide reinforcement and resistance against collapse over and above what is provided by the corrugations themselves.

Figure 3:
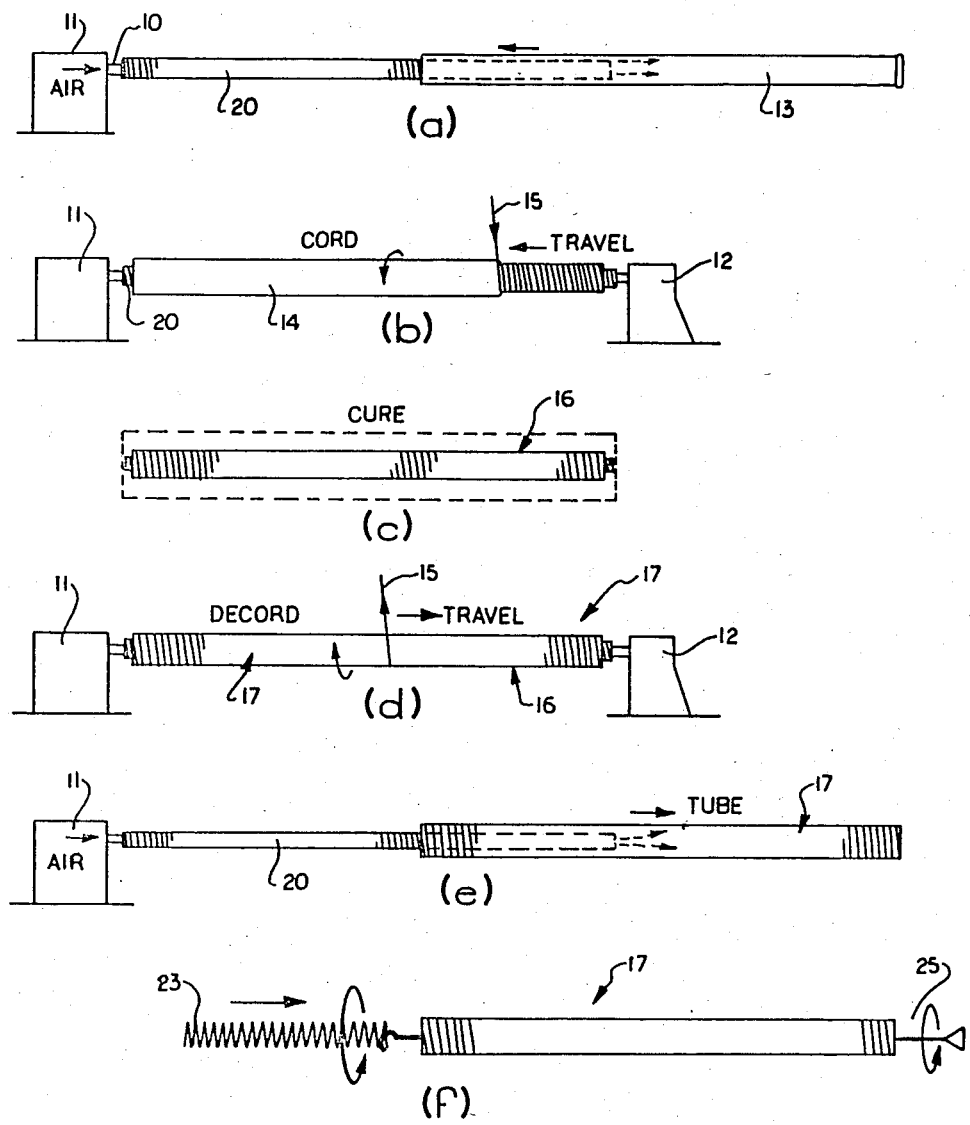
FIG. 3 is a series of elevational views, including views A through F, which illustrate in somewhat diagrammatic form the sequential steps of the method of the invention.
Figure 4:
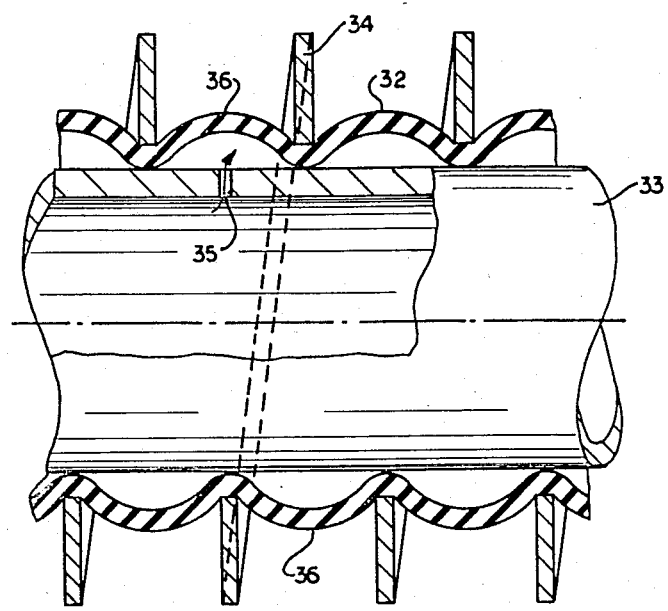
FIG. 4 is a fragmentary, sectional view on an enlarged scale, illustrating the forming of a flexible, helically corrugated length of tubing in accordance with the "axially extensible external form" aspect of the method of the invention, with parts broken away and shown in section for the purpose of illustration.

FIG. 3 illustrates the method for making the product of the invention using the cording method, and FIG. 4 illustrates reinforced tubing being produced in accordance with the "axially extensible helix" method.

Referring to FIG. 3, a length of corrugated tubing is formed from an extruded sleeve of unreinforced, vulcanizable stock, and subsequently provided with the flexible, resilient reinforcing helix 23.

A tubular mandrel 10 is mounted at one end in a rotary support 11 that supplies the rotary drive, and at the other end in a removable idling rotary support 12. An extruded sleeve 13 of vulcanizable stock is positioned over the mandrel 10. Then a cord 15 is wrapped around the assembly to press the extruded sleeve 13 into a helical groove on the mandrel. This procedure is illustrated and described in greater detail in U.S. Pat. No. 2,832,096. When the assembly has been generally formed, the mandrel 10, together with the sleeve 13 and cord 15, is removed from the rotary supports 11 and 12 and placed in a curing oven.

The helical thread on the mandrel 10 for the extruded sleeve 13 may be formed, for example, by wrapping a strip 20 of relatively hard, flexible rubber around the mandrel 10 to define a single thread of uniform pitch. The core strip 20 has a central ridge that forms the helical crest of the thread and its sides abut one another to define the helical root. The procedure for forming the flexible corrugated hose length is best illustrated sequentially in FIG. 5. The extruded sleeve 13 of vulcanizable stock is slid axially over the assembled mandrel 10 and core strip 20. It will be noted that during the positioning of the sleeve 13, the mandrel 10 is supported in cantilever fashion by the rotary support 11, and air under pressure to facilitate the sliding of the sleeve in an axial direction is supplied through the rotary support 11.

When the sleeve 13 is properly positioned on the mandrel, as shown in FIG. 5(a), the cord 15 is wrapped around the sleeve as indicated in FIG. 5(b). The cord 15 is wrapped under tension with successive turns thereof on spaced, parallel relation, and located in the helical grooves of the mandrel assembly to press adjacent portions of the sleeve 13 into the grooves. During the wrapping or "cording" process, the outer end of the mandrel 10 is placed in an idling rotary support 12, and the mandrel is rotated to wind or wrap the cord in a desired fashion.

Once the wrapping is completed, the tail end of the cord 15 is secured to the mandrel 10 and the resulting assembly 16 is removed from the rotary supports 11 and 12 and placed in a curing oven (FIG. 5(c)).

In the curing of the tubing, the tightly wound cord 15 maintains compressive radial forces on the sleeve and, in effect, forms an external mold which confines the rubber during curing. The softening of the rubber sleeve 13 by the curing heat causes the rubber to flow into and take the shape of the helical groove formed in the mandrel assembly. The curing of the rubber while thus confined by the cord results in the formation of a length of corrugated tubing.

After the assembly 16, including the cured corrugated tube length 17, is removed from the heat treating oven and cooled, the assembly is placed with the ends of the mandrel 10 supported by the rotary supports 11 and 12, and the mandrel is rotated while the cord 15 is unwrapped from the assembly, as illustrated in FIG. 5(e). When the unwrapping is completed, air under pressure is supplied to the space between the outer surface of the mandrel 10 and the inner surface of the corrugated tube length 17, and the unreinforced tube is slid axially off the mandrel. The resulting product produced by the method described is then provided with an internal reinforcement in the following manner.

A helix or helical length of flexible, resilient rod 23 is formed to have approximately the same length as the corrugated tube length 17, and also approximately the same helix diameter as the root diameter of the internal groove formed in the tube length 17. Then, a pulling tool 25 is extended through the tube length 17 and latched into engagement with an end of the wire rod helix, which has been placed in axial alignment with the tube length. The pulling tool is then pulled toward the tube length and rotated at the same time to reduce the diameter of the wire rod helix but, as a result of the additional rotation, maintaining a relatively constant pitch. With the wire rod helix in this condition (e.g., stressed but not sufficiently reduced in diameter to be pulled directly through the tube length) it is rotated so as to mesh with the helical groove but not to exert pressure thereon that would generate friction. The rotation and axial advancing are continued until the wire rod helix extends entirely through the unreinforced rubber tube length. When this is done, the pulling tool is released frm the end of the helix, whereby the helix expands radially into tight conformance with the groove.

FIG. 4 illustrates the principles embodying the method of the invention, but wherein the tubing is made in accordance with the prior art "axially extensible helix" method. In accordance with that method, the unreinforced, extruded sleeve 32 is placed on a cylindrical mandrel 33, a helical external form 34 is placed over the sleeve 32, and air under pressure is introduced through the ports 35 in the mandrel 33 to inflate the tube and form bulges 36 between the convolutions of the helical external forming member 34. Then, the helical forming member 34 is axially collapsed to squeeze the bulges 36 between the convolutions and form embryonic corrugations. The resulting assembly is disassembled by removing the external forming member 34 and the sleeve 32 from the mandrel 33, after which the preformed sleeve is placed on a curing mandrel, axially compressed to the desired shape, and cured in a curing oven.

The helical reinforcing component 23 (FIG. 1) is formed of relatively stiff, resilient wire rod, and has about the same helix outer diameter as the root diameter of the internal helical groove. The wire rod helix 23 is placed ajdacent to and in axial alignment with the length of corrugated rubber tubing. Then, an elongated pulling tool 25 is extended axially through the length of corrugated rubber tubing from the end opposite the wire rod helix. The pulling tool is then placed in engagement with the end of the wire rod helix 23, whereupon the pulling tool is pulled toward the tube length and rotated at the same time to reduce the diameter of the wire rod helix but, as a result of the additional rotation, maintaining a relatively constant pitch. With the wire rod helix in this condition (e.g., stressed but not sufficiently reduced in diameter to be pulled directly through the tube length), it is rotated so as to mesh with the helical groove but not to exert pressure thereon that would generate friction. The rotation and axial advancing are continued until the wire rod helix extends entirely through the unreinforced rubber tube length. When this is done, the pulling tool is released from the end of the helix, whereby the helix expands radially into tight conformance with the groove.

While the method of the invention has been illustrated and described with respect to a specific embodiment thereof, this is intended for the purpose of illustration rather than limitation, and other variations and modifications of the specific method herein shown and described will be apparent to those skilled in the art, all within the intended spirit and scope of the invention. Accordingly, the patent is not to be limited in scope and effect to the specific embodiment herein shown and described, nor in any other way that is inconsistent with the extent to which the progress in the art has been advanced by the invention.

What is claimed is:

1. A method for making flexible, corrugated rubber tubing with helical corrugations combined with an internal helical reinforcing component, comprising the steps of:

positioning an extruded sleeve of unreinforced, uncured rubber on a forming mandrel;

placing an external, collapsible helical form around said sleeve to define helical convolutions;

expanding said sleeve radially to form radial bulges between said convolutions;

axially foreshortening said sleeve and said helical form to form embryonic corrugations in said sleeve;

heat-treating said rubber sleeve to set said corrugations to form a flexible length of unreinforced, corrugated rubber tubing with a helical internal groove having a root diameter approximately equal to the inner diameter of said helical form;

forming a helix of relatively stiff, resilient wire rod having about the same helix outer diameter as the root diameter of said internal helical groove;

placing said wire rod helix adjacent to and in axial alignment with said length of corrugated rubber tubing while holding the end of said helix opposite said rubber tubing;

extending an elongated pulling tool axially through said length of corrugated rubber tubing from the end opposite said wire rod helix;

gripping with said pulling tool the end of said wire rod helix adjacent said corrugated rubber tubing;

pulling said wire rod helix with said pulling tool toward said corrugated rubber tubing while simultaneously rotating said pulling tool to reduce the diameter of said wire rod helix, thus maintaining a relatively constant pitch;

moving said stretched wire rod helix axially through said tube and simultaneously rotating it in a direction to thread said helix into said length; and thereafter releasing said pulling tool from said helix whereby said helix expands radially into tight conformance with said groove.

* * * * *